United States Patent
Heller et al.

(10) Patent No.: US 10,865,669 B2
(45) Date of Patent: Dec. 15, 2020

(54) RUN OUT TOLERANT RECIPROCATING CYLINDER SLEEVE SEAL CARBON SCRAPER

(71) Applicant: DANA AUTOMOTIVE SYSTEMS GROUP, LLC, Maumee, OH (US)

(72) Inventors: Thomas G. Heller, Seattle, WA (US); Alexander S. Williamson, Leo, IN (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 389 days.

(21) Appl. No.: 15/755,732

(22) PCT Filed: Aug. 24, 2016

(86) PCT No.: PCT/US2016/048347
§ 371 (c)(1),
(2) Date: Feb. 27, 2018

(87) PCT Pub. No.: WO2017/040139
PCT Pub. Date: Mar. 9, 2017

(65) Prior Publication Data
US 2020/0224563 A1    Jul. 16, 2020

Related U.S. Application Data

(60) Provisional application No. 62/212,022, filed on Aug. 31, 2015.

(51) Int. Cl.
*F01L 7/16*    (2006.01)
*F16J 15/32*    (2016.01)
(Continued)

(52) U.S. Cl.
CPC ............ *F01L 7/16* (2013.01); *F02F 1/004* (2013.01); *F16J 15/122* (2013.01); *F16J 15/32* (2013.01);
(Continued)

(58) Field of Classification Search
CPC .. F01L 7/16; F02F 1/004; F02F 11/007; F16J 15/3224; F16J 15/32; F16J 15/56;
(Continued)

(56) References Cited

U.S. PATENT DOCUMENTS 4,141,562 A * 2/1979 Wu .................. F16J 15/3284
277/309
4,171,818 A    10/1979 Moskowitz et al.
(Continued)

FOREIGN PATENT DOCUMENTS

DE    102009053720 A1    5/2011
EP    2187102 A1    5/2010
(Continued)

OTHER PUBLICATIONS

Machine-generated English translation of DE 102009053720, obtained via Espacenet Patent Search.
(Continued)

*Primary Examiner* — Jacob M Amick
(74) *Attorney, Agent, or Firm* — Marshall & Melhorn, LLC

(57) ABSTRACT

A reciprocating cylinder seal assembly (10, 10') has an elastomeric seal, where separate inner (16, 16') and an outer (18, 18') valve seal retainers are located within the reciprocating cylinder seal assembly. The reciprocating cylinder seal assembly (10, 10') better controls radial run out than past seals in reciprocating cylinder engines. Further, the reciprocating cylinder seal assembly may have a scraper (42') that is in contact with the outer valve seal retainer (18').

15 Claims, 2 Drawing Sheets

(51) Int. Cl.
*F16J 15/12* (2006.01)
*F02F 1/00* (2006.01)
*F16J 15/3224* (2016.01)
*F16J 15/3216* (2016.01)

(52) U.S. Cl.
CPC ....... *F16J 15/3216* (2013.01); *F16J 15/3224* (2013.01)

(58) Field of Classification Search
CPC ...... F16J 15/122; F16J 15/3216; F16J 15/322; F16C 33/72
See application file for complete search history.

(56) References Cited

U.S. PATENT DOCUMENTS

| | | | |
|---|---|---|---|
| 4,426,094 A | 1/1984 | Antonini | |
| 4,504,068 A | 3/1985 | Holzer | |
| RE33,715 E | 10/1991 | Miura | |
| 5,163,692 A | 11/1992 | Schofield et al. | |
| 5,237,971 A | 8/1993 | Worsley | |
| 5,368,312 A | 11/1994 | Voit et al. | |
| 5,884,919 A | 3/1999 | Saito | |
| 6,367,811 B1 | 4/2002 | Hosokawa et al. | |
| 6,764,079 B1 | 7/2004 | Hegemier et al. | |
| 7,025,030 B2 | 4/2006 | Leimer | |
| 7,914,209 B2 | 3/2011 | Yamamoto et al. | |
| 8,544,445 B2 | 10/2013 | Cleeves et al. | |
| 8,602,419 B2 | 12/2013 | Namuduri et al. | |
| 8,904,998 B2 | 12/2014 | Cleeves | |
| 9,016,255 B2 | 4/2015 | Cleeves et al. | |
| 9,052,018 B2 | 6/2015 | Hegemier et al. | |
| 9,284,863 B2 | 3/2016 | Kurth et al. | |
| 2009/0230630 A1 | 9/2009 | Kondo et al. | |
| 2010/0212622 A1* | 8/2010 | Cleeves | F01L 5/06 123/188.5 |
| 2011/0197756 A1 | 8/2011 | Hold et al. | |
| 2012/0126490 A1 | 5/2012 | Maskaliunas et al. | |
| 2012/0291744 A1 | 11/2012 | Elsbett et al. | |
| 2013/0213220 A1 | 8/2013 | Matthew et al. | |
| 2014/0373802 A1* | 12/2014 | Cleeves | F01L 7/16 123/188.5 |
| 2015/0192205 A1 | 7/2015 | Oiyama et al. | |
| 2015/0240949 A1* | 8/2015 | Tones | F16J 15/322 277/550 |

FOREIGN PATENT DOCUMENTS

| | | |
|---|---|---|
| GB | 1300590 A | 12/1972 |
| WO | 2014205291 A2 | 12/2014 |

OTHER PUBLICATIONS

International Search Report of International Application No. PCT/US2016/048347, dated Jan. 1, 2017.

* cited by examiner

RUN OUT TOLERANT RECIPROCATING CYLINDER SLEEVE SEAL CARBON SCRAPER

FIELD OF THE DEVICE

The present device relates to a vehicle valve seal. More particularly, the present device relates to a vehicle reciprocating cylinder sleeve seal used in a reciprocating cylinder engine.

BACKGROUND OF THE DEVICE

For a vehicle with a reciprocating engine, a valve seal assembly cooperates with a vehicle reciprocating liner to provide lubrication and to contain engine gases within engine inlet and exhaust ports. To accomplish these functions, the valve seal assembly typically includes an elastomeric seal that is in an elastomeric-to-metal seal between the vehicle-elastomeric seal and the vehicle reciprocating liner.

Unfortunately, valve seal assemblies in use with existing reciprocating cylinder engines have reciprocating mechanisms that experience significant radial run out, thereby allowing oil and exhaust gasses to improperly enter various parts of the engine. Consequently, such engines operate poorly and their lifespans are shortened. Hence, what is sought is a vehicle reciprocating cylinder engine that better controls radial run out associated with its reciprocating mechanisms and better contains oil and exhaust gasses with its valve seals, thereby better operating the reciprocating cylinder engine and extending the reciprocating cylinder engine life span.

SUMMARY

A reciprocating cylinder seal assembly comprises an elastomeric seal with separate inner and outer valve seal retainers disposed therein and thereon.

Further objects and advantages will be apparent from the following description, reference being made to the accompanying drawings forming a part of a specification, wherein like reference characters designate corresponding parts of several views.

DESCRIPTION OF THE PREFERRED EMBODIMENT

It is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in this disclosure. Hence, specific dimensions, directions or other physical characteristics relating to the embodiments disclosed are not to be considered as limiting, unless the disclosure expressly states otherwise.

Figures 1, 2:
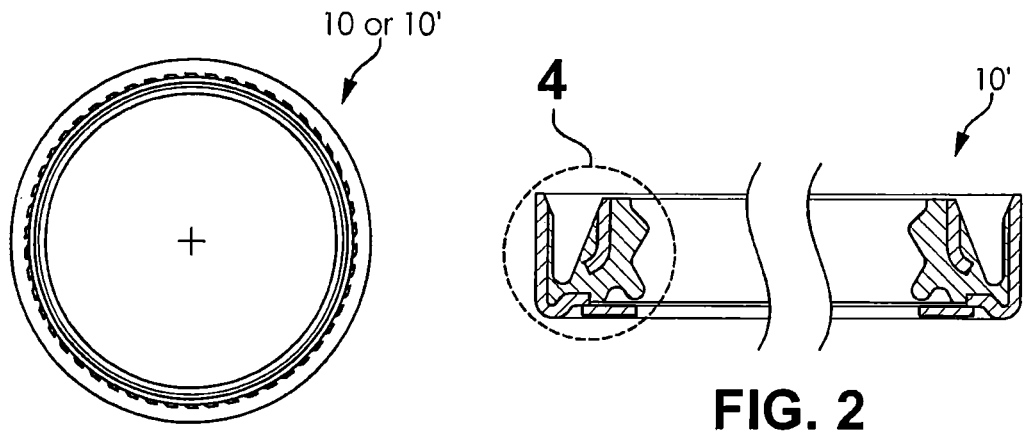
FIG. 1 is an axial view of a reciprocating engine cylinder seal assembly.
FIG. 2 is a cross sectional plan view of the reciprocating cylinder seal assembly of FIG. 1 with a scraper.
Figure 3:
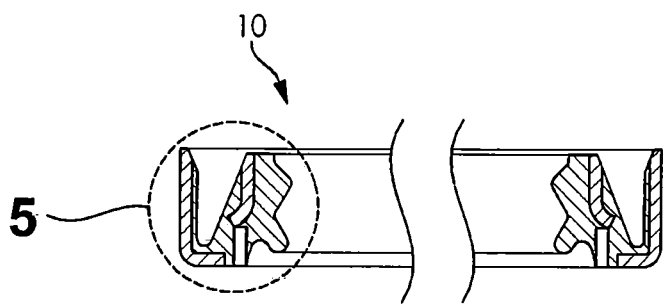
FIG. 3 is a cross sectional plan view of the reciprocating cylinder seal assembly of FIG. 1 without the scraper.
Figure 6:
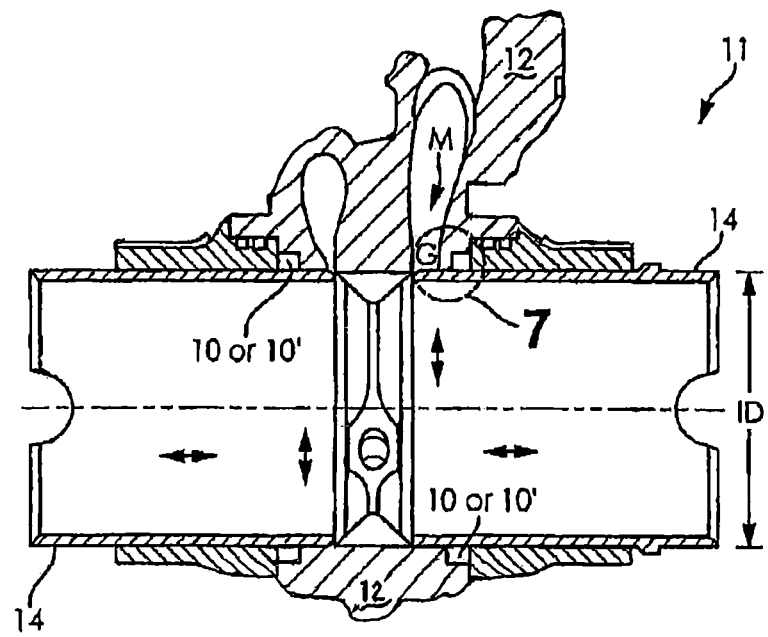
FIG. 6 is a cross sectional view of a reciprocating cylinder engine.
Figure 7:
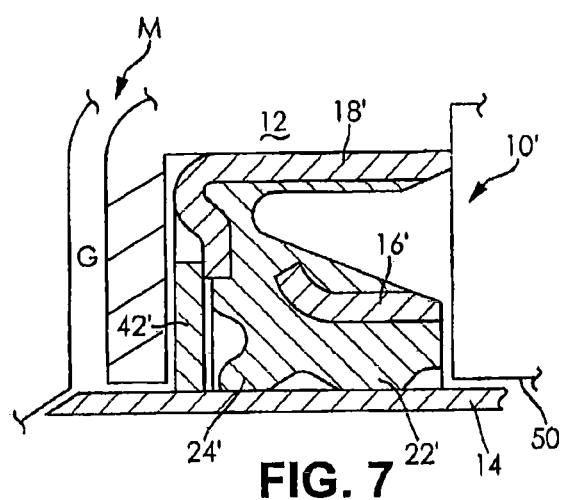
FIG. 7 is a cross sectional inset view of area 7 of a portion of the reciprocating cylinder engine of FIG. 6.

FIG. 1 depicts reciprocating cylinder seal assemblies 10, 10'. FIG. 6 illustrates a portion of a vehicle reciprocating engine 11 having a cylindrical housing 12 where a reciprocating liner 14 is installed in sliding contact with the cylindrical housing 12, at the ID of the cylindrical housing 12. The reciprocating cylinder seal assemblies 10, 10' are located radially outwardly from the liner 14 and are in an elastomeric-to-metal sealing contact with the liner 14, as shown in FIG. 7. Reciprocating motion associated with the reciprocating liner 14 is illustrated by the two double headed axially directed arrows within the ID of the cylindrical housing 12. The reciprocating engine 11 may be used, for example, in a motor scooter, an automobile, a motorcycle, and a truck, but is not limited thereto.

The reciprocating cylinder seal assemblies 10, 10' respectively have a metal, preferably steel, axially inner retainer 16, 16' and a metal, preferably steel, axially outer retainer 18, 18' disposed therein. The axially inner retainers 16, 16' and the axially outer retainers 18, 18' are respectively detailed in FIGS. 3 and 5 and FIGS. 2 and 4. Each of the outer retainers 18, 18' are disposed radially outward from its respective inner retainer 16, 16'.

Specifically, for each of the reciprocating cylinder seal assemblies 10, 10', the inner retainers 16, 16' are "J" shaped and are embedded from a top and within their respective elastomeric seals 20, 20'. The bottom of each "J" of the inner retainers 16, 16' bends out radially. The seals 20, 20' have respective oil lips 22, 22' and gas lips 24, 24'. When installed in the reciprocating engine 11, the oil lips 22, 22' and gas lips 24, 24' make sliding elastomeric-to-metal contact with the reciprocating liner 14. The inner retainers 16, 16' are embedded from above the oil lip side of their respective seal 20, 20' (as viewed respectively in FIGS. 5 and 4) to an inner retainer point position 28, 28' between the respective lips 22, 22', 24, 24', which is the lowest point for each of the respective inner retainers 16, 16' within its seal 20, 20'.

On the other hand, the outer retainers 18, 18' are axially disposed completely across from their respective farthest upper radial outer edge of their respective cylinder seal assemblies 10, 10', where a thin tapered portion 21, 21' of the elastomeric seals 20, 20' is axially disposed on the radially inward side of the outer retainers 18, 18'. Each of the respective thin tapered portions 21, 21', of the elastomeric seals 20, 20', forms a slanted "V" between the inner 16,16' and the outer retainers 18, 18'.

Figures 4, 5:
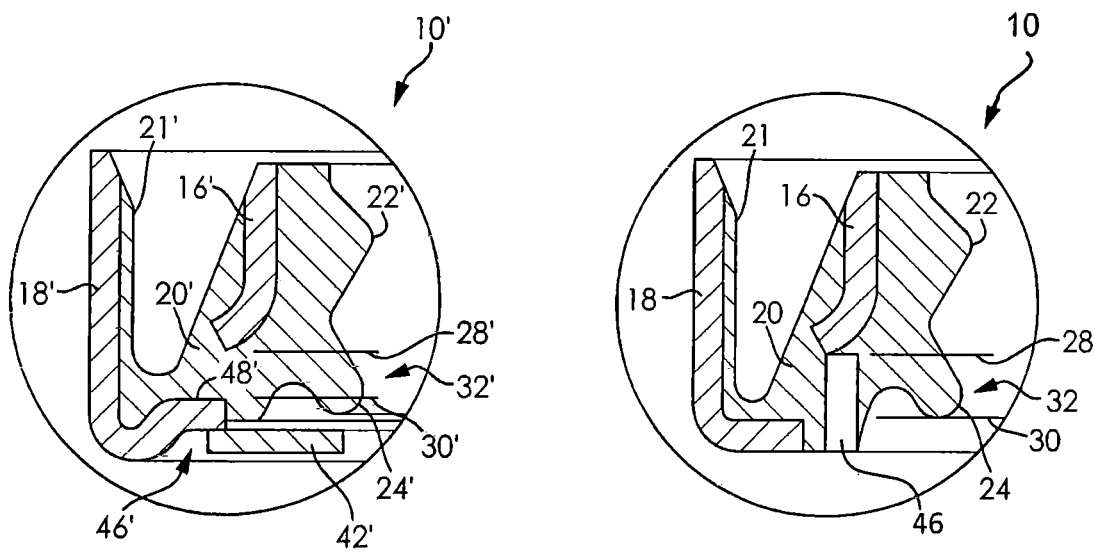
FIG. 4 is a cross sectional inset view of circled area 4 of a portion of the reciprocating cylinder seal assembly of FIG. 2.
FIG. 5 is a cross sectional inset view of circled area 5 of a cutaway portion of the reciprocating cylinder seal assembly of FIG. 3.

Further, the outer retainers 18, 18' are radially disposed inwardly to a lower seal point position 30, 30', that is below (as viewed respectively in FIGS. 5 and 4) its respective inner retainer point position 28, 28', and at or near to the bottom of its respective gas lip 24, 24'. The outer retainer 18', however, slightly bends up axially and then is radially disposed inwardly above a space 46', wherein it is in contact with a scraper seal 42' as shown in FIG. 4. The scraper seal 42' may comprise carbon.

As a result of these structures 10, 10', middle seal positions 32, 32' of the elastomeric seals 20, 20' are defined as being between respective inner retainer point position 28, 28' and lower seal point position 30, 30', which are illustrated in FIGS. 5 and 4. Hence, it is a discovery that these middle seal portion positions 32, 32' result in better utilization of oil and better containment of exhaust gasses, in conjunction with the lips 22, 22', 24, 24'. Also, the middle seal portion positions 32, 32' are eccentricity tolerant of the radial movement of the reciprocating liner 14, which results in better control of run out that is experienced with such a reciprocating engine 11, than with conventional seals. Motion associated with run out of the reciprocating liner 14 is depicted in FIG. 6 by the double headed radially directed arrows that are illustrated therein.

Hence, the cylinder seal assemblies 10, 10' address the concerns of vehicle reciprocating engine manufacturers who require a seal design that is capable of withstanding large run out (see Table below). This is especially true for sealing the large diameter cylinder reciprocating liner 14, which functions like a valve. The resulting reciprocating cylinder seal assemblies 10, 10' have some similarities to a valve seal, however, with the above-stated differences and improvements.

The orientation of the valve seal retainers 16, 16', 18, 18' is opposite of that which might be found for a valve guide application, wherein the reciprocating-cylinder seal assemblies 10, 10' are pressed into the ID of the cylindrical-housing 12.

For the subject reciprocating cylinder seal assemblies 10, 10', a primary locating retainer jacket (not shown) is used to locate the reciprocating cylinder seal assemblies 10, 10' into the ID of the cylindrical housing 12. The reciprocating cylinder seal assemblies 10, 10' are bonded to the housing 12 and used as the sealing surface to the cylinder reciprocating liner 14. The presence of the outer retainer rings 18, 18' provide stability to the elastomer material forming the sealing surface of the seals 20, 20'. For the reciprocating engine 11, pressurized oil is present on the side of the oil lip 22, 22' that is axially above (as seen in FIGS. 5 and 4) each seal 20, 20', and unrestricted manifold gas G pressure (see manifold M in FIGS. 6 and 7) is present on the side of the gas lip 24, 24' that is axially below each seal 20, 20'. The above described arrangements of the reciprocating cylinder seal assemblies 10, 10' and seal 20, 20' are different from a valve seal application in which the oil side of its seal is exposed to oil splashing, but not full fluidized oil gas G pressure.

Figure 8:
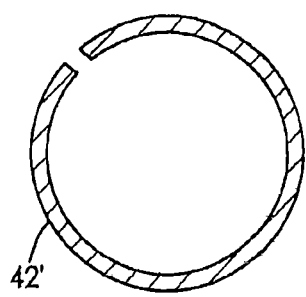
FIG. 8 is an axial view of the scraper.

For the reciprocating cylinder seal assembly 10 and seal 20, there is an axially oriented space 46 that starts at the inner retainer point position 28 and extends axially to the bottom of the reciprocating cylinder seal assembly 10. For the reciprocating cylinder seal assembly 10' and seal 20', there is a space 46' in which a "piston ring like" scraper seal 42' (shown in FIGS. 2, 7, and 8) can rest and rotate in contact with the reciprocating liner 14 and rotate freely in the space 46' that a step up portion 48' of the outer retainer 18' creates between the housing 12, the outer retainer 18', and the reciprocating liner 14.

In the embodiment of the reciprocating cylinder seal assemblies 10', the scraper seal 42' not only provides a function as a seal but also a function as a gas barrier. The scraper seal 42' is installed in a fashion that generates hoop tension, maintaining contact with a cylinder sleeve wall 50, which is shown in FIG. 7. As the scraper seal 42' is held stationary, this results in a scraping affect as the piston liner 14 reciprocates. The scraper seal 42' provides a gas barrier much like a labrynth seal (not shown) would. As the scraper seal 42' is in contact with the reciprocating liner 14, impinged gas G must travel along the back side of the scraper seal 42' (to the left of the scraper seal 42', as shown in FIG. 7) and progress-around the outer retainer 18', before reaching the scraper seal 42' itself. Hence, the scraper seal 42' functions as an effective gas barrier.

TABLE

| Expected max run out tolerances of liner 14: | |
|---|---|
| 1. Tipping due to running clearance + thermal growth = | 0.05 mm |
| 2. Axis offset due to glide circularity and run out tols. = | 0.025 mm |
| 3. Axis offset due to block core run out tols. = | 0.06 mm |
| 4. Sleeve valve roundness = | 0.015 mm |
| Total = | 0.150 mm |

In accordance with the provisions of the patent statutes, the principles and modes of operation of this device have been described and illustrated in its preferred embodiments. However, it must be understood that the device may be practiced otherwise than specifically explained and illustrated without departing from its spirit or scope.

What is claimed is:

1. A reciprocating cylinder seal assembly, comprising:
   an elastomeric seal;
   characterized by the elastomeric seal comprising separate inner and outer valve seal retainers, wherein the inner valve seal retainer is disposed within the elastomeric seal and the outer valve seal retainer is disposed on a radially outer surface of the elastomeric seal,
   said elastomeric seal further defining a space in which a piston ring-like scraper seal resides and rotates therein.

2. The reciprocating cylinder seal assembly of claim 1, wherein the inner and outer valve seal retainers comprise steel.

3. The reciprocating cylinder seal assembly of claim 1, wherein the elastomeric seal is disposed in a vehicle reciprocating engine having a cylindrical housing where a reciprocating piston liner is in sliding contact with the cylindrical housing, at an inside diameter of the cylindrical housing; and
   wherein the reciprocating cylinder seal assembly is located radially outwardly from the reciprocating piston liner and is in a sliding elastomeric-to-metal sealing contact with the reciprocating piston liner.

4. The reciprocating cylinder seal assembly of claim 3, wherein the reciprocating cylinder seal assembly is selected from the group consisting of a seal, having an axially oriented space that starts at an inner retainer point position and extends axially to the bottom of the reciprocating cylinder seal assembly and a seal, having a space wherein said piston ring-like scraper seal rests in contact with the reciprocating liner and rotates in the space that a step up portion of the outer retainer creates between the housing, the outer retainer, and the reciprocating piston liner.

5. The reciprocating cylinder seal assembly of claim 3, wherein the elastomeric seal has an oil lip and a gas lip, wherein the oil lip and gas lip make the sliding elastomeric-to-metal contact with the reciprocating piston liner; and
   wherein the inner retainer is embedded from above the oil lip side of the seal to an inner retainer point position between the respective lips that is the lowest point of the inner retainer within the seal.

6. The reciprocating cylinder seal assembly of claim 3, wherein the outer retainer is axially disposed completely across the radial outer edge of the cylinder seal assembly, and a thin portion of the elastomeric seal is axially disposed on an inward side of the outer retainer.

7. The reciprocating cylinder seal assembly of claim 5, wherein the outer retainer is radially disposed inwardly to a lower seal point position that is below an inner retainer point position, and at or near a bottom of the gas lip.

8. The reciprocating cylinder seal assembly of claim 7, wherein the outer retainer, slightly bends up axially and is radially disposed inwardly above a space, whereupon the outer retainer is in contact with the piston ring-like scraper seal.

9. The reciprocating cylinder seal assembly of claim 5, wherein a middle seal portion position of the elastomeric seal is defined to be between an inner retainer point position and a lower seal point position hence, the middle seal portion position in conjunction with the oil lip and the gas lip, contain exhaust gasses and are eccentricity tolerant of the radial movement of the reciprocating liner so as to control run out of the reciprocating engine.

10. The reciprocating cylinder seal assembly of claim 5, wherein the elastomeric seal is bonded to the housing and used as the sealing surface to the reciprocating piston liner, wherein the outer retainer ring provides stability to elastomer material forming the sealing surface of the seal; and
wherein pressurized oil is present on a side of the oil lip axially above the seal, and unrestricted manifold pressure is present on a side of the gas lip below the seal.

11. The reciprocating cylinder seal assembly of claim 3, wherein the piston-ring-like scraper seal rotates in contact with the reciprocating piston liner and rotates freely in the space that a step up portion of the outer retainer creates between the housing, the outer retainer, and the reciprocating piston liner; and
wherein the scraper seal provides a seal functionality and a gas barrier functionality.

12. The reciprocating cylinder seal assembly of claim 3, wherein the scraper seal has hoop tension, so as to maintain contact with a cylinder sleeve wall.

13. The reciprocating cylinder seal assembly of claim 3, wherein the piston ring-like scraper seal is in a scraping relationship with the reciprocating piston liner.

14. The reciprocating cylinder seal assembly of claim 3, wherein the piston ring-like scraper seal is a gas barrier, so as to function as a labrynth seal.

15. The reciprocating cylinder seal assembly of claim 3, wherein when the piston ring-like scraper seal is in contact with the reciprocating piston liner and traveling impinged gas is present along a back side of the piston ring-like scraper seal, and in progress around the retainer before reaching the piston ring-like scraper seal, the piston ring-like scraper seal is a gas barrier.

* * * * *